United States Patent [19]

Siano et al.

[11] Patent Number: 4,694,058
[45] Date of Patent: Sep. 15, 1987

[54] HIGH MOLECULAR WEIGHT TERPOLYMERS OF ACRYLAMIDE, ACRYLIC ACID SALTS AND ALKYLACRYLAMIDE

[75] Inventors: Donald B. Siano, Fanwood; Jan Bock, Bridgewater, both of N.J.

[73] Assignee: Exxon Research and Engineering Company, Florham Park, N.J.

[21] Appl. No.: 866,724

[22] Filed: May 27, 1986

Related U.S. Application Data

[63] Continuation of Ser. No. 801,331, Nov. 25, 1985.

[51] Int. Cl.$^4$ ............................................. C08F 220/70
[52] U.S. Cl. ............................ 526/307.2; 525/328.2; 525/329.4; 526/303.1
[58] Field of Search .......................... 525/328.2, 329.4; 526/303.1, 307.2

[56] References Cited

U.S. PATENT DOCUMENTS

| | | | |
|---|---|---|---|
| 4,254,249 | 3/1981 | Cottrell et al. | 525/329.4 |
| 4,395,524 | 7/1983 | Emmons et al. | 526/304 |
| 4,520,182 | 5/1985 | Turner et al. | 525/307.2 |
| 4,521,580 | 6/1985 | Turner et al. | 525/307.2 |
| 4,528,348 | 7/1985 | Turner et al. | 525/303.1 |

Primary Examiner—Joseph L. Schofer
Assistant Examiner—Bernard Lipman
Attorney, Agent, or Firm—Richard E. Nanfeldt

[57] ABSTRACT

Novel water soluble copolymers of acrylamide, oil soluble higher alkylacrylamide and alkali metal acrylate have been found to provide efficient viscosification of water or brine. The process for synthesizing them relies on the complete solubilization of the water insoluble monomer into an aqueous solution of the water soluble monomer(s) by means of a suitable water soluble surfactant. A redox initiator system is used in conjunction with high monomer concentration and a low reaction temperature. The surfactant chosen and its concentration is one that produces a clear, uniform, homogeneous mixture in the presence of the monomers and gives a product which remains a clear uniform, homogeneous mixture with no phase separation as the reaction proceeds toward completion. The molecular weight of the resulting polymer after isolation from the surfactant is sufficiently high that it gives an intrinsic viscosity greater than about 12 dl/g.

2 Claims, No Drawings

HIGH MOLECULAR WEIGHT TERPOLYMERS OF ACRYLAMIDE, ACRYLIC ACID SALTS AND ALKYLACRYLAMIDE

This is a division of application Ser. No. 801,331 filed 11-25-85.

BACKGROUND OF THE INVENTION

1. Field of the Invention

This invention relates to water soluble polymers that have both a very high molecular weight and contain both water soluble monomers and a water insoluble monomer, and a method of producing them. More particularly, it relates to a process for the polymerization of water soluble acrylamide monomer and a water insoluble higher alkylacrylamide monomer, such as octylacrylamide. The process relies on solubilizing the water insoluble monomer into a micellar aqueous solution of the water soluble monomer and of a surfactant in order to effect the copolymerization. A redox catalyst mixture at low concentrations is used to initiate the polymerization at a low temperature. The polymer may also be post-treated by the addition of base in order to produce a partial hydrolysis of the acrylamide to give a metal salt of acrylic acid, thereby converting it into an anionic polymer that has the characteristics of a polyelectrolyte. Alternatively, the anionic groups may be incorporated into the copolymer during the polymerization by, for example, including in the reaction mixture acrylic acid, acrylamide and the higher alkylacrylamide.

2. Description of the Prior Art

Polyacrylamide and hydrolyzed polyacrylamide are well-known water soluble polymers useful for water treatment, paper strengthening agents, dewatering sludge and for controlling the viscosity of water or brine for secondary or tertiary oil recovery. Some of these processes require polymers having a very high molecular weight for optimum effectiveness. A particularly important use that relies on the molecular weight of the polymer for effectiveness is the viscosification of water or brines.

The preparation, characterization and solution properties of polyacrylamide are surveyed by W. M. Kulick, R. Knwieski and J. Klein, *Prog. Polym. Sci.*, I, 373 (1982) by W. H. Montgomery in *Water-Soluble Gums and Resins*, 2nd Ed., R. L. Davidson and M. Sitig, Editors, Van Nostrand Reinhold, New York, 1968, chapter 9; and by P. Molyneux, in *Water Soluble Synthetic Polymers: Properties and Behavior*, Volume II, CRC Press, Inc., Boca Raton, Fla., 1983, chapter 3.

Technically the term "polyacrylamide" refers also to products which are obtained by the hydrolysis of polyacrylamide or by the copolymerization of acrylamide with acrylic acid. Processes for preparing polyacrylamides and related polymers are well-known in the art. Minsk, et al., U.S. Pat. No. 2,486,191, for example, teaches the polymerization of acrylamide and methacrylamide in mixtures of water and a water miscible alcohol to control the molecular weight of the product. Suen and Schiller, U.S. Pat. No. 2,820,777, teaches the continuous polymerization and hydrolysis of acrylamide to polymers containing both amide and carboxylate groupings whereby the degree of hydrolysis and degree of polymerization may be readily controlled. Friedlander, in U.S. Pat. No. 2,886,558, describes the use of an alkali-metal hydroxide to effect a controlled conversion of the amide groups of a preformed polyacrylamide to yield a partially hydrolyzed polyacrylamide. The preparation and characterization of partially hydrolyzed polyacrylamides are also given in a paper by J. Klein and R. Heitzmann in *Makromol Chem.*, 179, 1895 (1978).

While the object of many of these patents is to produce high molecular weight polyacrylamides for optimum efficiency, it is still very desirable to further extend the range of molecular weight available for the polymers and, thereby, enable a decrease of the concentrations required for various uses. This approach to improved properties may be, however, limited by other factors. For example, it is well known that polymers with higher molecular weight degrade more readily under shear, such as might be encountered in pumps and mixers, and also generally dissolve more slowly than lower molecular weight polymers.

An alternative method for making polyacrylamides that are even more effective has been described in U.S. Pat. Nos. 4,521,580 and 4,528,348. These patents describe the incorporation of a small mole fraction of water insoluble monomer into the water soluble polymer during the polymerization. The hydrophobic groups tend to associate with one another in an aqueous solution, resulting in an increase in viscosification efficiency relative to a polymer without the hydrophobic side groups. The polymers produced by these methods, which are disclosed in U.S. Pat. No. 4,520,182, are nonionic and, therefore, have the advantage that they are relatively insensitive to the presence of salts in the water. However, this previous art has not been able to produce polymers having sufficiently high molecular weight that the viscosification efficiency at infinite dilution (i.e., the intrinsic viscosity) is comparable to or higher than that achieved by the commercially available biopolymer (xanthan) or hydrolyzed polyacrylamide. The latter have intrinsic viscosities at a shear rate of 1.3 s$^{-1}$ of about 80 and 25 dl/g, respectively, while these patents describe only copolymers having intrinsic viscosities from about 1 to about 7 dl/g.

The possibility of producing copolymers of acrylamide and higher alkylacrylamides is also suggested in such prior art as Lenke, et al., U.S. Pat. No. 4,151,333; Barua, et al., U.S. Pat. No. 4,098,987; Evani, European Pat. Application 0057875; and Emmons, et al., U.S. Pat. No. 4,395,524. Landoll, U.S. Pat. No. 4,304,902, describes copolymers of ethylene oxide with long chain epoxides which require relatively large polymer concentrations (above about 1%) for thickening water and require surfactants for solubility due to irregularities in the polymerization. In a related case, U.S. Pat. No. 4,428,277, modified nonionic cellulosic ether polymers are described. The polymers claimed in each of these applications are either water insoluble or have such a low molecular weight that they have limited usefulness for the viscosification of water or brine. The processes used to produce them are also quite different from that described in the present invention.

One process suggested by this prior art (Lenke, Emmons and Evani) is to cosolubilize the monomers in a solvent or solvent mixture having solubility properties intermediate between water and a hydrocarbon solvent. Although this undoubtedly allows the comonomers to come into close proximity to one another, since the dispersion is on a molecular scale, this process presents difficulties. For example, often the copolymer is insoluble in the mixed solvent which is capable of solubilizing the monomers. This leads to precipitation of the copolymer when it has a molecular weight too low to produce efficient viscosification. In addition, the reaction product is usually heterogeneous and, therefore, requires additional processing steps. Moreover, the water miscible solvents, such as alcohols, acetone, ether and acetic acid, which are used are good chain transfer agents and when used in reasonable quantities leads to the decreased molecular weights and, hence, to the poor viscosification efficiency that these materials exhibit.

Another method used to copolymerize water soluble and water insoluble monomers uses a conventional emulsion polymerization process to suspend the water insoluble comonomer in an emulsified form by the use of a dilute aqueous solution of a water soluble surfactant. Here the droplets of the water insoluble monomer are at least one micron in diameter. The product, as exemplified by Barua, U.S. Pat. No. 4,098,987, generally is a copolymer in the form of particulates with diameters on the order to 500 to 2,000 Å in diameter. The water insoluble copolymer so produced has a negligible efficiency for viscosifying water or brine.

SUMMARY OF THE INVENTION

Novel water soluble terpolymers of acrylamide, oil soluble higher alkylacrylamide and alkali metal acrylate have been found to provide efficient viscosification of water or brine. The process for synthesizing them relies on the complete solubilization of the water insoluble monomer into an aqueous solution of the water soluble monomer(s) by means of a suitable water soluble surfactant. A redox initiator system is used in conjunction with high monomer concentration and a low reaction temperature. The surfactant chosen and its concentration is one that produces a clear, uniform, homogeneous mixture in the presence of the monomers and gives a product which remains a clear, uniform, homogeneous mixture with no phase separation as the reaction proceeds toward completion. The molecular weight of the resulting polymer after isolation from the surfactant is sufficiently high that it gives an intrinsic viscosity greater than about 12 dl/g.

DETAILED DESCRIPTION OF THE INVENTION

The polymers described in this invention are terpolymers of acrylamide, an alkylacrylamide and a metal salt of an acrylic acid, characterized by the formula:

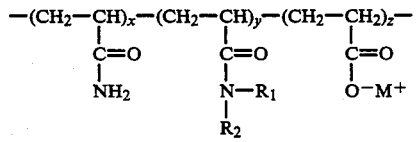

wherein $R_1$ is preferably a $C_6$ to $C_{22}$ straight chain or branched alkyl or cyclo group, more preferably $C_6$ to $C_{20}$, and most preferably $C_6$ to $C_{18}$; and $R_2$ is the same or different alkyl group as Rhd 1, or hydrogen; and $M^+$ is an alkali metal cation. Typical, but non-limiting, examples of preferred alkyl groups are hexyl, octyl, decyl, dodecyl and hexadecyl groups. Typical, but non-limiting, examples of preferred cations are sodium, potassium and ammonium. The mole fraction of acrylamide, x, is preferably about 0.50 to about 0.999, more preferably about 0.60 to about 0.995, and most preferably 0.70 to about 0.995. The mole fraction of the n-alkyl acrylamide is preferably about 0.001 to about 0.10, more preferably about 0.002 to about 0.05 and most preferably about 0.002 to about 0.02. The mole fraction of the metal salt of the acrylic acid salt, z, is preferably about 0.0 to about 0.5, more preferably about 0.05 to about 0.4, and most preferably 0.1 to about 0.30.

The polymers are sufficiently high in molecular weight to give an intrinsic viscosity measured in 2 weight percent of NaCl at 25° C. of at least 12 dl/g. Thus, the weight average molecular weights of the terpolymers are greater than about 8 million.

The process of this invention enables the copolymerization of the water soluble monomer, acrylamide and water insoluble monomers, such as oil-soluble alkylacrylamide, to give copolymers which are very efficient viscosifiers of water and brine. The process relies on cosolubilizing the water insoluble monomer into a predominantly aqueous media by the use of a suitable water soluble surfactant, such as sodium dodecyl sulfate. When mixed with an aqueous solution of the water soluble monomer, the surfactant solution can disperse the water insoluble monomer on an extremely fine scale so that the reaction mixture is isotropic, clear and homogeneous. These micellar reaction mixtures are free of visible oil droplets or particulates of the water insoluble monomer. The polymerization can, therefore, be initiated by water soluble initiators to give copolymers that are substantially free of visible particulates. The resultant reaction product remains homogeneous throughout the course of the reaction.

Micelles formed by the surfactant which solubilize the water insoluble monomer are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least one micron. They, therefore, tend to phase separate upon standing, leading to undesirable inhomogeneities in the produced copolymer. The homogeneous micellar reaction mixture is, on the other hand, much more stable against dimixing than the formulations used in emulsion polymerization processes. Indeed, no stirring is required during the course of the micellar copolymerization. The micellar aggregates remain extremely finely dispersed throughout. Moreover the extremely dispersed nature of the micellar aggregate permits the copolymerization to occur in such a way that a water soluble copolymer is produced which does not contain particulates or latexes of water insoluble polymers. These would be detrimental in such applications as secondary oil recovery, which requires a product which is substantially free of pore plugging particulates.

The surfactants which may be used in this process may be one or more of the water soluble surfactants, such as salts of alkyl sulfates, sulfonates and carboxylates, or alkyl arene sulfates, sulfonates or carboxylates. Preferred surfactants are sodium and potassium salts of decyl sulfate, dodecyl sulfate or tetradecyl sulfate. Most preferred is sodium dodecyl sulfate. For these ionic surfactants the Krafft point temperature (defined as the temperature minimum required for micelle formation) must be below the temperature used for the polymerization in order for micelles of the surfactant to form. Nonionic surfactants can also be used for solubilizing the oil soluble alkylacrylamide. For example, ethoxylated alcohols, ethoxylated alkyl phenols, ethylene oxide-propylene oxide copolymers and polyoxyethylene ethers and esters and the like can be used. Surfactants which contain both nonionic and anionic functionality, e.g., sulfates and sulfonates of ethoxylated alcohol and alkyl phenols, can also be used.

Combinations of these surfactants may also be used—the requirement in either case is that the surfactant(s) solubilize the oil soluble monomer to give a clear, isotropic homogeneous polymerization mixture. The actual concentration of the surfactant(s) chosen in any particular case will be determined by this requirement. An additional requirement for the surfactant is that it not be one which acts as chain transfer agent for the reaction to any strong degree so that the polymerization may proceed to the maximum extent without premature chain termination in order for the desired very high molecular weights to be produced.

The copolymers of the present invention are prepared by using a particular redox catalyst system. It is composed of a water soluble tertiary amine, triethylamine, as the reducing agent in combination with a water-soluble persulfate, such as an alkali metal or ammonium persulfate, as the oxidizing agent. When this particular catalyst system is used under the right conditions of temperature and the right concentrations of all of the components of the polymerization mixture, and the polymerization is carried out for a sufficient time, it is possible to obtain copolymers of acrylamide and oil soluble alkylacrylamide that are soluble in water, free of particulates or gel of insoluble polymer, that has the desired very high molecular weight. The mole ratio of the persulfate to triethylamine should be about 2 to about 6, with a mole ratio of about 4 to be preferred. The concentration of the redox catalyst mixture is about 0.1 to about 0.01 grams per hundred grams of monomer and the monomers comprise about 10 to about 50 weight percent of the reaction solution. The surfactant used is about one-third or less of the weight of the monomers. The polymerization is conducted in the absence of oxygen at a temperature from about 5° C. to about 30° C. for at least 6 hours. Other redox type initiators may also be used in this invention. These may be prepared by combining a peroxide such as hydrogen peroxide, an alkyl peroxide, or a persulfate such as potassium or ammonium persulfate with a reducing agent such as a tertiary amine, a sulfite, a ferrous or ferric salt and/or an azoinitiator such as azobisisorbutyronitrile.

The copolymer may be recovered from the reaction mixture by precipitation with non-solvents for the polymer, such as acetone or methanol. Alternatively, the polymer may be recovered by drying the reaction mixture with heated air or nitrogen. For some uses it may not be necessary to separate the pure polymer from the reaction mixture, but instead a dilution of the reaction mixture may be used.

The hydrolysis of the preformed copolymer may be carried out by the addition of an alkali metal hydroxide to the solution for such a period of time and temperature, at a concentration sufficient to cause the desired degree of hydrolysis to form the terpolymer of acrylamide, N-alkylacrylamide, metal salt of acrylic acid. Alternatively, the acid functionality may be introduced into the polymer by copolymerizing it with acrylic acid and subsequently neutralizing it with a stoichiometric amount of base.

The polyacrylamides of this invention have been found to be useful for thickening aqueous fluids. To prepare these thickened fluids, an amount of the copolymer may be dissolved into the fluid by mixing or agitation, using any of a number of techniques well known in the art. It is desirable to use relatively low agitation conditions since these terpolymers have a tendency to cause and stabilize foams which can be difficult to break. The aqueous solutions may contain inorganic salts, particulates or other additives. A preferred method for preparing thickened brine solutions having a salt concentration of about 0.1 to about 10.0 weight percent (NaCl) involves first preparing a concentrated solution of the polymer in relatively fresh water and then adding a more concentrated brine solution. The amount of the terpolymer required to produce a given amount of thickening will depend upon the composition of the brine and the temperature. Preferably, about 0.001 to 2 weight percent, more preferably about 0.005 to about 1.0 weight percent, and most preferably about 0.01 to about 0.5 weight percent copolymer provides the desired level of viscosification.

Measurement of the dilute solution viscosity can be made with conventional Couette, capillary or other viscometers. For the Examples given below, a Contraves low shear viscometer, Model LS-30, together with a No. 1 cup and No. 1 bob were used. Temperatures were controlled to ±0.1° C. and measurements were made at a rotational speed corresponding to a shear rate of $1.28 \, s^{-1}$. In contrast to conventional water soluble polymers, the polymers of this invention often exhibit long relaxation times under shear, so relatively long measurement times were employed to give equilibrium shear stresses.

DESCRIPTION OF THE PREFERRED EMBODIMENT

The following examples explain the invention, which are by way of illustration, but not of limitation.

COMPARATIVE EXAMPLE 1

Polyacrylamide

A one liter water jacketed reaction flask with a mechanical stirrer made of glass and a teflon blade was used as a polymerization vessel. Fifty grams of twice recrystallized (from acetone) acrylamide was added and the flask was twice alternately evacuated and purged with nitrogen. The nitrogen was purified by passing it through a filter to remove particulates and a pyrogallol solution to remove residual oxygen. Next, 500 ml of boiled, deionized water was added and the vacuum-$NW_2$ purge was carried out twice more. When dissolution was complete and the temperature was brought to 20° C., 0.020 g of solid $K_2S_2O_8$ and then 0.10 ml of a solution containing 0.0028 g of triethylamine were added (this gives a mole ratio of $K_2S_2O_8$ to TEA of 4:1). The stirring was discontinued about three hours after the initiator was added. The reaction was continued over night while the nitrogen was bubbled slowly into the mixture. The product was a rubbery, slightly hazy solid. A portion of it was cut up with scissors into pieces a few mm on a side and diluted with deionized water to give a solution of 2,000 ppm polymer. The dissolution was accomplished over night. No haze or particulates were observed in the solutions. The solution was brought to a concentration of 2 weight percent NaCl by the addition of solid NaCl. The viscosity at a shear rate of 1.28 s$^{-1}$ was 30.7 cP. A portion diluted to 1,500 ppm gave 15.2 cP and another portion diluted to 500 ppm gave 2.3 cP. It gave an intrinsic viscosity of 28 dl/g and a Huggins' constant of 0.46. This value of the Huggins' constant is close to the values previously determined for homopolyacrylamides with lower intrinsic viscosities. The highest previously reported value for the intrinsic viscosity of polyacrylamide is 26 dl/g.

EXAMPLE I

Acrylamide/Octylacrylamide/(99.25)//0.75 Mole Percent Copolymer

The same procedure was followed as in Example 1, except that the weights of components were, in the order of addition:

| Component | Weight (Grams) | Molecular Weight | Moles |
|---|---|---|---|
| Acrylamide | 49.04 | 71.1 | 0.690 |
| Octylacrylamide | 0.96 | 183.0 | 5.25 × 10$^{-3}$ |
| Sodium Dodecylsulfate | 15.85 | 288.0 | 55.0 × 10$^{-3}$ |
| Potassium Persulfate | 0.020 | 270.3 | 7.4 × 10$^{-5}$ |
| Triethylamine | 0.0028 | 149.2 | 1.88 × 10$^{-5}$ |

The 500 ml of deionized, boiled water was added after the sodium dodecylsulfate. In order for complete dissolution to occur the solution was heated briefly to 35° C., then lowered to 20° C. The viscosity visibly increased about two hours after the addition of the initiators. The stirring was then terminated and the bubbling tube was raised above the solution. The reaction product was removed 18 hours after the initiator was added. The product was a clear, rubbery solid. A dilution to one weight percent of polymer did not completely dissolve in water, even after two weeks of stirring. A similar result was found at 2,000 ppm—the polymer formed a weak gel which could be seen by the inhomogeneous appearance of the thin sheet of solution formed when the container was tilted. However, at 500 ppm a clear solution could be formed and its viscosity in 2% NaCl was 2.2 cP, which gives a reduced viscosity of 28 dl/g.

EXAMPLE II

Hydrolyzed Acrylamide/Octyl Acrylamide Copolymer

Polymer from Example I was diluted to 2,000 ppm of polymer (based upon the assumption of 100% conversion) and an equal number of moles of NaOH was added and the solution was heated to 40° C. for 23 hours. The polymer was precipitated with an equal volume of methanol and redissolved into a volume of water equal to the original volume. It was then placed into dialysis tubing and dialyzed exhaustively against water. A water-clear solution was found after this process. A solution with a concentration of about 1,000 ppm was sonicated to reduce the viscosity, passed through a mixed bed ion exchange column in order to put the polymer into the acid form, then titrated with NaOH. The concentration of the effluent from the column was determined gravimetrically and the degree of hydrolysis was found to be 14%. The intrinsic viscosity was 28 dl/g. Although the intrinsic viscosity is nearly the same as that found for the homopolyacrylamides of Comparative Example 1, the Huggins' constant was very high—it had a value of 3.0. The high value of the Huggins' constant found for this polymer also implies that at low concentrations its viscosification efficiency is higher than for polymers which are non-associating (like that of comparative example 1) and therefore have Huggins' constants of less than about 0.8. The high value of the Huggins' constant also indicates that the terpolymer of acrylamide, octylacrylamide and sodium acrylate associates in aqueous solution.

EXAMPLES III–VIII

Acrylamide-Octylacrylamide Copolymers Having Varing Degrees of Hydrolysis

Other degrees of hydrolysis of polymer from Example 1 were prepared by using a similar method to that used in Example II by using 4N to 0.1 N NaOH for different lengths of time. The conditions used are summarized in Table I and some of their properties are described in Table II. The data in Table II is arranged in order of increasing degree of hydrolysis, given in the first column. The second column gives the results of measurements of the viscosity of samples at 500 ppm in 2% NaCl at 25° C. at a shear rate of 1.28 s$^{-1}$. All of these values are greater than the values found for the non-associating polymer given in Example 1, demonstrating the superior viscosifying efficiency of the associating, hydrolyzed copolymer. The next two columns give the intrinsic viscosity and the Huggins' constant of several of the polymers dissolved in 2% NaCl as measured by the Contraves viscometer. Two of the three cases gave extremely high values for the intrinsic viscosity. At the higher degrees of hydrolysis, the Huggins' constant was found to be decreased.

A supplementary measure of the viscosification efficiency is the screen factor. This is a ratio of the time required for a solution of the polymer to pass through five 200 mesh screens to the time required for passage of the solvent. It is a measure of the resistance of the fluid to elongational flow. This is given for several of the solutions at a polymer concentration of 1000 ppm in 2% NaCl in the last column of Table II. All of these were greater than 9, which was the value found for the unhydrolyzed, non-associating polymer of Comparative Example 1.

EXAMPLE IX

Hydrolyzed Acrylamide-Octylacrylamide Copolymer

Into a two liter polymerization vessel 73.56 g of acrylamide (twice recrystallized from methanol), 1.44 g of octylacrylamide, and 23.78 g of sodium dodecyl sulfate were added. The vessel was purged of oxygen by alternately pulling a vacuum and flushing with nitrogen that had been bubbled through a basic pyrogallol solution. Then 750 g of boiled, deionized water was added and the purging process carried out six more times. The monomers were dissolved by stirring and heating to 35° C. for 20 minutes. It was then cooled back to 20° C. and nitrogen bubbled through the solution for two hours. The initiator, 0.0028 g of triethylamine and 0.020 g of potassium persulfate, each dissolved separately in 1 ml of water, was then added. Within 30 minutes the solution had noticeably thickened, and the polymerization was carried out for an additional 18 hours. The polymer was then removed from the flask as a solid, rubbery gel. To carry out the hydrolysis of the copolymer 400 g, the gel was macerated into small pieces and placed in 2,000 ml of deionized water. After stirring for 150 minutes 13 g of sodium hydroxide was added and kept at a temperature of 50° C. for 90 minutes. While still at 50° C. the polymer was precipitated by the addition of an excess of methanol. It was washed with a Waring blender for 10 seconds, the methanol filtered off and the polymer was rinsed twice in methanol. It was then dried in a vacuum oven overnight at room temperature.

The degree of hydrolysis of the polymer was determined by a potentiometric titration of a small sample that had been passed through both anionic and cationic ion exchange resins, and found to be 16%. The intrinsic viscosity in brine containing 3 weight percent Nacl and 0.3 weight percent CaCl$_2$ was 19 dl/g.

TABLE I

| Polymer | Hydrolysis Time Hours | Hydrolysis Temperature °C. | Percent Polymer Concentration | NaOH Concentration | Percent Hydrolysis |
|---|---|---|---|---|---|
| Example II | 23 | 40 | 0.2 | 0.028 N | 14 |
| Example III | 21 | 35 | 2.0 | 4 | 59 |
| Example IV | 70 | 35 | 2.0 | 4 | 70 |
| Example V | 1 | 35 | 2.0 | 4 | 41 |
| Example VI | 0.5 | 35 | 2.0 | 1 | 16 |
| Example VII | 1 | 35 | 2.0 | 0.01 | 3 |
| Example VIII | 1 | 35 | 2.0 | 0.04 | 6 |

TABLE II

| Percent Hydrolysis | N(1.28 s$^{-1}$)$^{500}$ ppm | [$\eta$] dl/g | $k_h$ | Screen Factor (1,000 ppm) |
|---|---|---|---|---|
| 3 | 8.0 cP | — | — | 29 |
| 6 | 14.0 | — | — | — |
| 14 | 7.1 | 28 | 3.0 | 11 |
| 16 | 6.0 | — | — | — |
| 41 | 5.9 | 75 | 0.20 | 17 |
| 59 | 2.6 | 69 | 0.10 | 14 |
| 70 | 4.0 | — | — | 30 |

What is claimed is:

1. A terpolymer characterized by the formula:

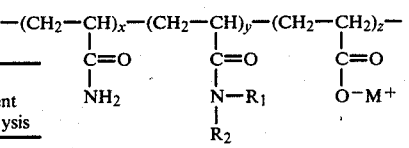

wherein R$_1$ is a C$_6$ to C$_{22}$ straight chain or branched alkyl or cycloalkyl group; R$_2$ is the same or different alkyl group as R$_1$, or hydrogen; M$^+$ is an alkali metal, wherein x is about 0.50 to about 0.999; y is about 0.002 to about 0.05; and z is about 0.1 to about 0.3 and the intrinsic viscosity of the terpolymer dissolved in 2% NaCl is greater than about 12 dl/g.

2. A terpolymer according to claim 1, wherein said terpolymer is soluble in a brine solution.